United States Patent [19]

Nishida et al.

[11] 4,404,508
[45] Sep. 13, 1983

[54] CONTROL METHOD FOR STOPPING DC MOTOR AT PREDETERMINED POSITION

[75] Inventors: Koji Nishida; Taneichi Kawai, both of Anjo, Japan

[73] Assignee: Aisin Seiki Kabushiki Kaisha, Kariya, Japan

[21] Appl. No.: 306,737

[22] Filed: Sep. 29, 1981

[30] Foreign Application Priority Data

Oct. 6, 1980 [JP] Japan .................................. 55-139707

[51] Int. Cl.³ ............................................. G05B 5/01
[52] U.S. Cl. ..................................... 318/611; 318/448
[58] Field of Search ......................... 318/611, 624, 448

[56] References Cited

U.S. PATENT DOCUMENTS

| | | |
|---|---|---|
| 3,704,404 | 11/1972 | Iverson .............................. 318/624 X |
| 3,722,434 | 3/1973 | Strother et al. . |
| 3,938,453 | 2/1976 | Muller . |
| 3,995,208 | 11/1976 | Parr .................................. 318/611 X |
| 4,055,788 | 10/1977 | Greely, Jr. ........................... 318/624 |
| 4,096,426 | 6/1978 | Tremaine et al. ................... 318/611 |
| 4,184,107 | 1/1980 | Turini et al. ..................... 318/611 X |
| 4,335,341 | 6/1982 | Ogasawara ..................... 318/611 X |

Primary Examiner—B. Dobeck
Attorney, Agent, or Firm—Finnegan, Henderson, Farabow, Garrett, Dunner

[57] ABSTRACT

A method of stopping a DC motor at a predetermined position by causing the motor to hunt the predetermined position following an overshoot. After each overshoot the applied DC motor drive voltage is reversed in polarity and diminished in magnitude to damp the rotative energy until the motor stops at the predetermined position.

5 Claims, 3 Drawing Figures

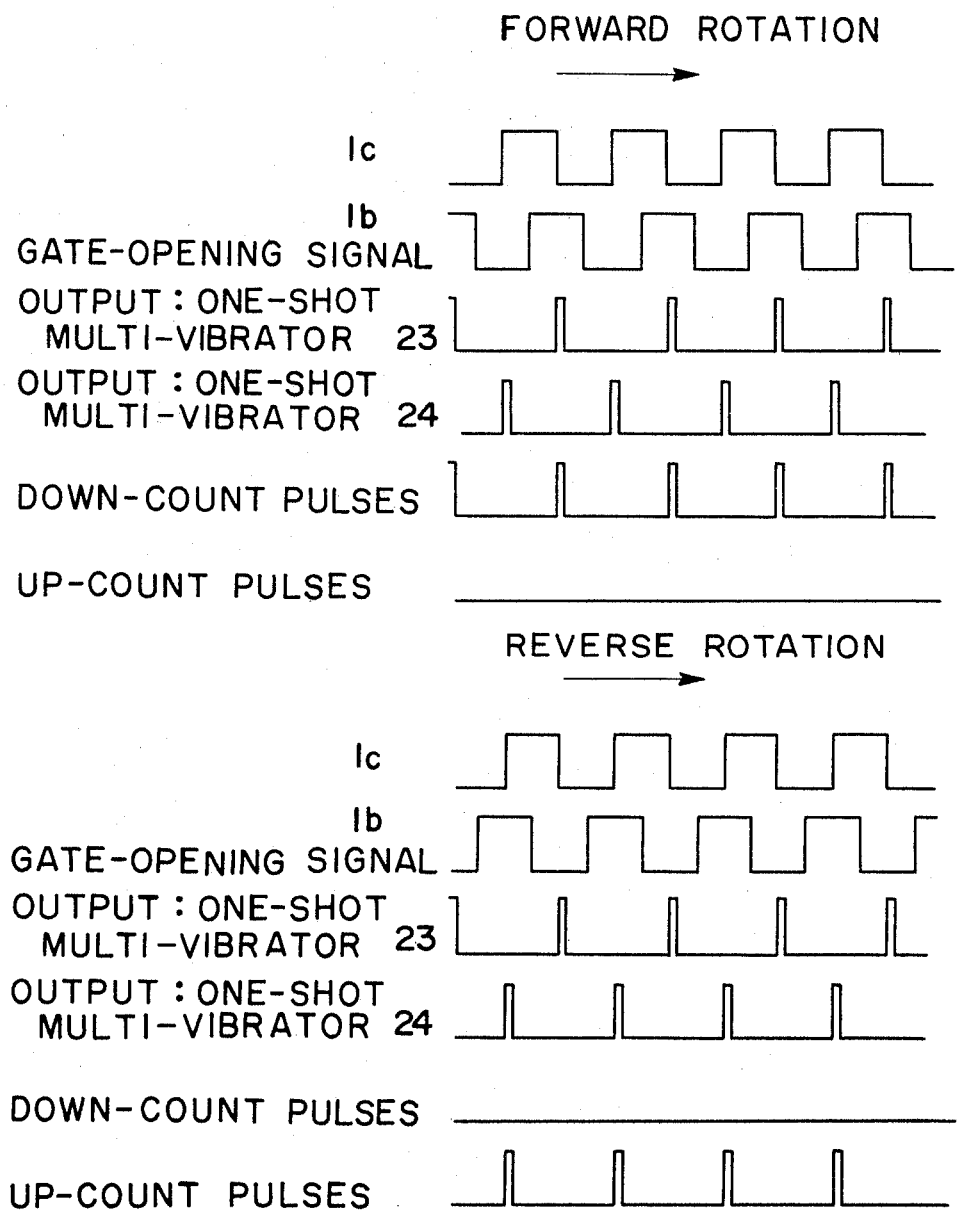

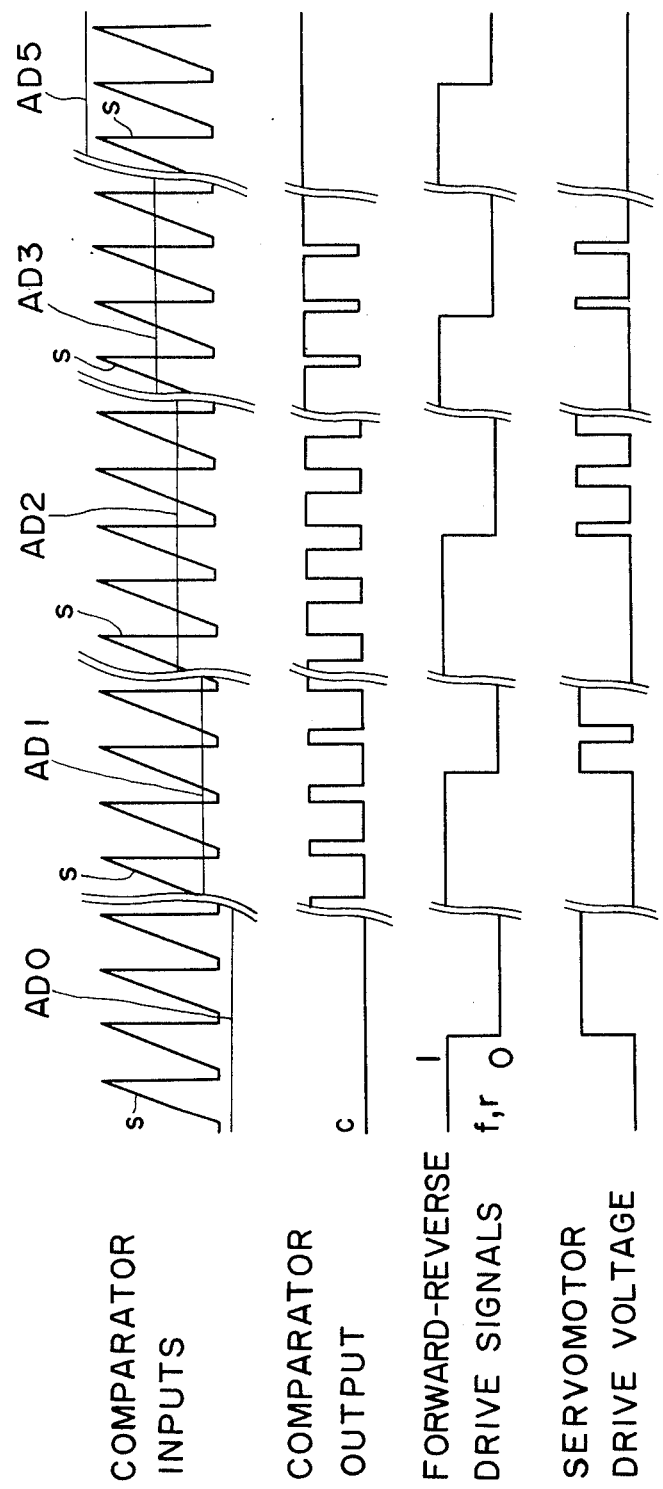

CONTROL METHOD FOR STOPPING DC MOTOR AT PREDETERMINED POSITION

BACKGROUND OF THE INVENTION

This invention relates to a control method for stopping a DC motor, particularly a DC servomotor, at a predetermined position.

DC servomotors are commonly employed to drive a movable element, and are particularly suited for driving the embroidery frame of an automatic embroidery machine. In such machines it is often necessary to stop the movable element at a predetermined position by suitable control of the DC servomotor, wherein the output shaft of the servo motor is brought to a halt at a prescribed orientation or stopping position. A problem encountered in effecting such control is that it is difficult to constantly hold gain of the control system at an optimum value when there are variations in load torque. Since an improper control system gain does not permit a consistent control accuracy to be attained, the output shaft of the servomotor cannot always be stopped at the point desired. It is conventional practice in the art to achieve the optimum gain by a regulation method, but a less troublesome and more precise method of control is desired.

SUMMARY OF THE INVENTION

Accordingly, an object of the present invention is to provide a control method for stopping a DC motor at a predetermined position in which the foregoing difficulties are overcome.

Another object of the present invention is to provide a control method for stopping a DC motor at a predetermined position with a high degree of accuracy without requiring adjustment of the control system gain despite variations in load torque.

According to the present invention, the foregoing and other objects are attained by providing a control method for stopping a DC motor at a predetermined position, wherein the DC motor is made to hunt the predetermined position following an overshoot. Specifically, when the output shaft of the DC motor arrives at the desired stopping position upon rotating by an amount corresponding to a preset value, the inertia possessed by the motor causes the output shaft to overshoot the stopping position. In accordance with the invention, the arrival of the output shaft at the stopping position is sensed, and the voltage applied to the DC motor is interrupted at such time. When the overshoot due to inertia is detected, a voltage having a suitable magnitude and polarity is applied to the DC motor to reverse its direction, causing the output shaft to again approach the stopping position. Then, by sequentially reducing the magnitude of the applied voltage each time a subsequent overshoot due to inertia is detected, the kinetic energy possessed by the motor is gradually damped to sequentially reduce the amount of overshoot until the output shaft comes to rest at the prescribed stopping position. This enables the output shaft of the DC motor, and hence the machine element driven by the shaft, to be stopped at the predetermined position without adjusting the control system gain, even in a case where the load torque varies.

These and other features and advantages of the present invention will be apparent from the following description taken in conjunction with the accompanying drawings.

BRIEF DESCRIPTION OF THE DRAWINGS

FIGS. 2 and 3 are timing charts of signals associated with the apparatus of FIG. 1.

DESCRIPTION OF THE PREFERRED EMBODIMENT

Figure 1:
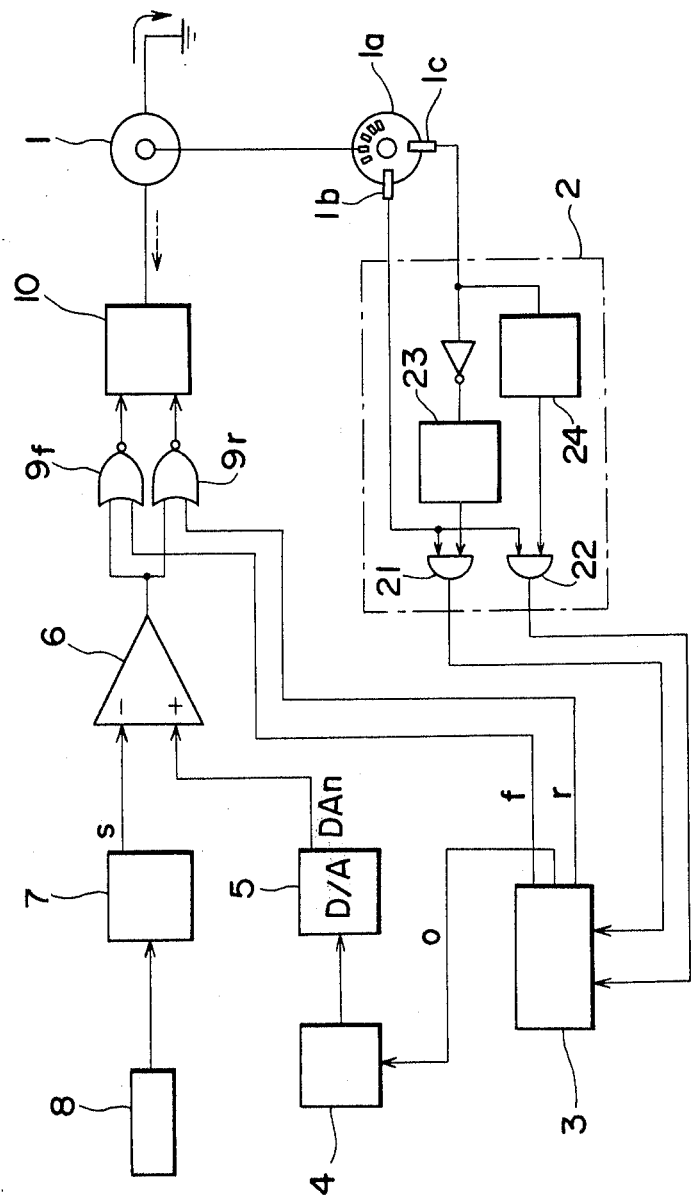
FIG. 1 is a block diagram illustrating an apparatus for practicing a control method for stopping a DC motor at a predetermined position in accordance with the present invention.

Referring to the apparatus of FIG. 1 and to the associated timing charts of FIGS. 2 and 3, a DC servomotor is designated generally at numeral 1. A code disk 1a, mounted on the output shaft of the servomotor 1, includes a pair of pick-up elements 1b, 1c for sensing rotation of the servomotor. The pick-up elements 1b, 1c are so arranged as to produce sense signals, displaced in phase from each other by 90°, in response to servomotor rotation. The output signals of the pick-up elements 1b, 1c, shown in FIG. 2, are applied to a sense amplifier 2 which is adapted to deliver a pulse train of a number of pulses in accordance with the amount of servomotor rotation, whether in the forward or reverse direction. To this end, the sense amplifier 2 includes a pair of AND gates 21, 22 and a pair of one-shot multivibrators 23, 24. The output signal of the pick-up element 1b is connected to one of the two input terminals of the AND gates 21, 22 and functions as a gate opening signal to open an AND gate when a pulse appears at the other input terminal. On the other hand, the output signal of the pick-up element 1c is applied to the one-shot multivibrators 23, 24. The one-shot multivibrator 23 produces a pulse in sync with the trailing edge of the output signal from pick-up element 1c and supplies this pulse to the other input terminal of AND gate 21. The one-shot multivibrator 24 produces a pulse in sync with the leading edge of the output signal from the pick-up element 1c and supplies this pulse to the other input terminal of AND gate 22. Thus, pulses produced by the one-shot multivibrators 23, 24 will be delivered by the respective AND gates 21, 22 when the gates are opened by the gate opening signal. If we let the condition in which the output of the pick-up element 1c leads the gate opening signal to be taken as indicating forward rotation of the DC servomotor 1, then the number of pulses delivered by AND gate 21 will correspond to the amount of forward rotation, these pulses conforming to the pulses from one-shot multivibrator 23 that are in sync with the trailing edge of the output from pick-up element 1c. Similarly, the number of pulses delivered by AND gate 22 will correspond to the amount of reverse rotation. In FIG. 2, therefore, forward rotation is indicated with the output of pick-up element 1c leads the gate opening signal, and reverse rotation is indicated when the opposite is true.

A device 3 for presetting the amount of servomotor rotation comprises an up/down counter. The pulsed output of AND gate 21, indicative of forward rotation, is connected to the down-count terminal of up/down counter 3 and is for this reason referred to as a down-count pulse in FIG. 2. Similarly, the pulsed output of AND gate 22, indicative of reverse rotation, is connected to the up-count terminal of up/down counter 3 and is referred to as an up-count signal. The up/down counter 3 is preset to a value corresponding to the amount by which the servomotor 1 is to be rotated to position its output shaft at a predetermined stopping point, and is adapted to produce a forward drive signal (logical "0") f when its content is positive, a reverse drive signal (logical "0") r when it content is negative, and a zero signal 0 when its content is zero. The zero signal 0 is a pulse which is applied to the input side of an overshoot counter 4. The counter 4, whose content is incremented by the zero pulses 0 from the up/down counter 3, in effect counts the number of times the output shaft of the servomotor 1 overshoots a prescribed stopping position. This will be described in further detail below. The output of counter 4, indicative of its content, is fed into a D/A converter 5 where it is converted into an analog signal $DA_n$ which is in turn applied to a comparator 6. The other input to comparator 6 is a sawtooth signal S produced by a sawtooth generator 7 in sync with a reference signal provided by a reference oscillator 8. The analog signal $DA_n$, whose level is a function of the content of overshoot counter 4, and the sawtooth signal S from the sawtooth generator 7, are taken as having the illustrated (FIG. 3) size relationship in order to facilitate the description of the invention. The comparator 6 compares the analog output $DA_n$ (where n=1, 2 . . .) with the sawtooth signal S, its output C going to logical "1" when $DA_n$ is greater than S ($DA_n > S$). A pair of two-input NOR gates are designated at 9f, 9r. The two inputs to NOR gate 9f are the output C of comparator 6 and the forward drive signal f from up/down counter 3, NOR gate 9f delivering logical "1" whenever the signal C at one input terminal goes to logical "0" with the signal f (logical "0") present at the other input terminal. The two inputs to NOR gate 9r are the comparator output C and the reverse drive signal r from the up/down counter 3, NOR gate 9r delivering logical "1" when signal C at one input terminal goes to logical "0" with the signal r (logical "0") present at the other input terminal. The outputs of NOR gates 9f, 9r are applied to a servo-amplifier 10 which responds by supplying the DC servomotor 1 with a positive voltage (for forward rotation, indicated by the solid arrow) or with a negative voltage (for reverse rotation, indicated by the broken arrow).

The operation of the present invention will now be described in further detail with particular reference to FIG. 3.

First, the amount by which the servomotor 1 is desired to be rotated to position its output shaft at a predetermined stopping point is preset in the up/down counter 3 as described above. When the preset value is positive, the forward drive signal f (logical "0") is applied to one input terminal of NOR gate 9f. Since the content of counter 4 is initially zero, the output $DA_o$ of D/A comparator is smaller than the minimum value of sawtooth signal S from the sawtooth generator 7 (i.e., $DA_o < S$), so that there is no output from the comparator 6 (i.e., C is logical "0"), the "0" logic entering the other input terminal of NOR gate 9f. Therefore, when the desired amount of servomotor rotation is set in up/down counter 3, NOR gate 9f delivers logical "1," giving rise to a positive voltage which starts to turn the servomotor 1 in the forward direction. When this occurs, the AND gate 21, in response to the aforesaid signal received from pick-up element 1b and from one-shot multivibrator 23, applies a down-count pulse to the down-count terminal of up/down counter 3 for each prescribed increment of rotation of the servomotor 1, whereby the content of counter 3 is counted down incrementally toward zero. When the actual amount of servomotor rotation comes into agreement with the preset value of the up/down counter 3 to bring the motor output shaft to the predetermined stopping position, the down-count pulses from AND gate 21 will have counted down the content of up/down counter 3 to zero so that the forward drive signal (logical "0") will no longer be delivered, and so that the zero signal 0 will have been sent to the counter 4. When the forward drive signal f vanishes, the output of NOR gate 9f changes in state from logical "1" to logical "0," causing the voltage to be removed from servomotor 1. Owing to the influence of inertia, however, servomotor 1 does not stop immediately but continues rotating in the forward direction and overshoots the predetermined stopping position. In consequence, AND gate 21 continues delivering down-count pulses which count down the content of counter 3 from zero to increasingly larger negative values. Accordingly, up/down counter 3 now delivers the reverse drive signal r (logical "0") to NOR gate 9r. In the meantime, the content of counter 4 has been incremented to "+1" owing to the zero signal 0 which arrived from up/down counter 3 when its content was counted down to zero as the output shaft overshot the predetermined stopping position. The D/A converter 5 therefore sends the comparator 6 an analog signal $DA_1$ whose level is in accordance with the counter content of "+1." Since signal $DA_1$ is larger than the minimum value of the sawtooth signal S, the comparator 6 produces a pulsed output (i.e., C goes to logical "1") in which the pulse width corresponds to the difference between the signals S, $DA_1$. However, the NOR gate 9r can deliver a "1" output only when both its inputs are logical "0." Accordingly, NOR gate 9r, which already has the "0" logic of signal r at one input terminal, will produce a "1" output only for those intervals $t_1$ during which the inequality $DA_1 < S$ holds, for it is during these intervals that both inputs to the NOR gate 9r will be logical "0." As a result of the "1" output from NOR gate 9r, the servomotor 1 is supplied with a negative voltage of a smaller absolute value than the voltage ordinarily impressed upon the servomotor. The servomotor 1 is consequently rotated in the reverse direction shortly after the abovementioned overshoot. When this reverse rotation starts, the up/down counter 3 begins receiving the up-count pulses from AND gate 22 owing to the above-described operation of code wheel 1a, pick-up elements 1b, 1c, and one-shot multivibrator 24. The negative content of up/down counter 3 therefore is counted up toward zero. When the amount of reverse rotation of servomotor 1 cancels the amount of overshoot to bring the motor output shaft to the aforesaid predetermined stopping position, the content of up/down counter will have been returned to a value of zero owing to the up-count pulses from AND gate 22, the reverse drive signal r (logical "0") vanishing to remove the voltage from servomotor 1. The zero signal 0 is delivered to counter 4 at this time. If the servomotor 1 still possesses rotative kinetic energy, it will continue rotating in the reverse direction and overshoot the predetermined stopping position from the other side, causing the up-count pulses to increment the up/down counter 3 in the positive direction from the value of zero. The result is that up/down counter 3 again sends the forward drive signal f (logical "0") to NOR gate 9f. In the meantime, the content of counter has been incremented to "+2" owing to the zero signal 0 from up/down counter 3, so that the D/A converter 5 sends the comparator 6 an analog signal $DA_2$ whose level corresponds to the value "+2." As a result, NOR gate 9f receives a pulsed output (C goes to logical "1") wherein the pulse width corresponds to the difference between the sawtooth signal S and the analog signal $DA_2$, in the same manner as described above in connection with the first overshoot, so that the output of NOR gate 9f goes to logical "1" only for those intervals $t_2$ during which the inequality $DA_2 < S$ holds, where $t_2 < t_1$. The servomotor 1 consequently is impressed with a voltage whole polarity (positive) is the same as the voltage applied at the time of the first overshoot, but whose absolute value is smaller. This smaller, positive voltage again rotates the servomotor 1 in the forward direction.

In accordance with the foregoing series of operations, the servomotor 1 overshoots the predetermined stopping position from both directions and thus undergoes hunting motion. However, as the applied voltage is diminished each time the servomotor overshoots, the amount of kinetic energy which remains whenever the pedetermined stopping position is reached, is damped in accordance with the number of overshoots up to that point and is gradually reduced to zero, at which time the output shaft of the servomotor 1 will come to rest at said predetermined stopping position.

It will be appreciated from the foregoing that the voltage impressed upon the servomotor 1 is not reduced, or regulated in any other way, until the output shaft arrives as the desired stopping position after rotating by the amount corresponding to the value preset in up/down counter 3. When the stopping position is reached, the impressed voltage is instead interrupted and the servomotor is caused to hunt the stopping position to dissipate the energy possessed by the servomotor. This enables the servomotor to be stopped at a predetermined position at a constant high accuracy without requiring that the control system gain be adjusted, even if the load torque varies. The invention is therefore particularly useful in controlling the DC servomotor used to drive an embroidery frame in an automatic embroidering machine.

As many apparently widely different embodiments of the present invention can be made without departing from the spirit and scope thereof, it is to be understood that the invention is not limited to the specific embodiment thereof except as defined in the appended claims.

What we claim is:

1. A control method for stopping a DC motor at a predetermined position, said DC motor having an output shaft, which method comprises the steps of:
   (a) applying a drive voltage to the DC motor to rotate the DC motor in a first direction;
   (b) interrupting the drive voltage impressed upon the DC motor when the output shaft arrives at the predetermined stopping position;
   (c) detecting whether the output shaft of the DC motor overshoots the prescribed stopping position;
   (d) applying to the DC motor a reverse drive voltage, which has a polarity opposite to that of the interrupted drive voltage as well as a smaller magnitude, when the output shaft overshoots the predetermined stopping position; and
   (e) repeating steps (a) through (d) to cause said DC motor to hunt the predetermined stopping position, while successively reducing the magnitude of the applied drive voltage and reverse drive voltage in accordance with the number of times the output shaft overshoots the predetermined stopping position as a result of the hunting operation, whereby the DC motor is stopped at the predetermined stopping position position by successively damping its kinetic energy with each application of the drive and reverse drive voltages of successively smaller amplitude.

2. The control method according to claim 1, further comprising the steps of:
   generating a sawtooth signal;
   storing the number of output shaft overshoots in a counter;
   converting said number into an analog voltage;
   producing a comparison signal at logical "0" when the level of the analog signal is less than the minimum value of the sawtooth signal, and at logical "1" when the level of the analog signal is greater than the minimum value of the sawtooth signal;
   generating a forward drive signal and a reverse drive signal; and
   producing a forward drive voltage when the NOR of the comparison signal and of the forward drive signal is logical "1," said reverse drive voltage when the NOR of the comparison signal and of the reverse drive signal is logical "1," and a zero voltage when the NOR of the comparison signal and the forward drive signal, and of the comparison signal and the reverse drive signal, are logical "0," the absolute value of said forward and reverse drive voltages growing successively smaller as the level of the analog signal grows successively larger than the minimum value of the sawtooth signal.

3. The control method according to claim 1, further comprising the step of:
   sensing during steps (a) through (e) each time the output shaft of the DC motor arrives at the predetermined stopping position.

4. A control method for stopping a DC motor at a predetermined position, said DC motor having an output shaft, which method comprises the steps of:
   (a) applying a forward drive voltage to the DC motor to rotate the DC motor in a first direction;
   (b) sensing when the output shaft of the DC motor arrives at the predetermined stopping position;
   (c) applying a zero drive voltage to the DC motor when the output shaft arrives at the predetermined stopping position;
   (d) detecting whether the output shaft of the DC motor overshoots the predetermined stopping position;
   (e) applying to the DC motor a reverse drive voltage, which has a polarity opposite to that of the forward drive voltage as well as a smaller magnitude, when the output shaft overshoots the predetermined stopping position;
   (f) repeating steps (a) through (e) to cause said DC motor to hunt the predetermined stopping position; and
   (g) successively reducing the magnitude of the applied forward drive voltage and reverse drive voltage as steps (a) through (e) are repeated, in accordance with the number of times the output shaft overshoots the predetermined stopping position as a result of the hunting operation, whereby the DC motor is stopped at the predetermined stopping position by successively damping its kinetic energy with each application of the forward and reverse drive voltages of successively smaller amplitude.

5. A control method for stopping a DC motor at a predetermined position, said DC motor having an output shaft, which method comprises the steps of:
 (a) applying a forward drive voltage to the DC motor to rotate the DC motor in a first direction;
 (b) sensing when the output shaft of the DC motor arrives at the predetermined stopping position;
 (c) applying a zero drive voltage to the DC motor when the output shaft arrives at the predetermined stopping position;
 (d) detecting whether the output shaft of the DC motor overshoots the predetermined stopping position;
 (e) applying to the DC motor a reverse drive voltage which has a polarity opposite to that of the forward drive voltage as well as a smaller magnitude, when the output shaft overshoots the predetermined stopping position;
 (f) repeating steps (a) through (e) to cause said DC motor to hunt the predetermined stopping position;
 (g) successively reducing the magnitude of the applied forward drive voltage and reverse drive voltage as steps (a) through (e) are repeated, in accordance with the number of times the output shaft overshoots the predetermined stopping position as a result of the hunting operation, whereby the DC motor is stopped at the predetermined stopping position by successively damping its kinetic energy with each application of the forward and reverse drive voltages of successively smaller amplitude;
 and wherein the method for producing said drive voltages include the further steps of:
 (h) generating a sawtooth signal;
 (i) storing the number of output shaft overshoots in a counter;
 (j) converting said number into an analog voltage;
 (k) producing a comparison signal at logical "0" when the level of the analog signal is less than the minimum value of the sawtooth signal, and at logical "1" when the level of the analog signal is greater than the minimum value of the sawtooth signal;
 (l) generating a forward drive signal and a reverse drive signal; and
 (m) producing said forward drive voltage when the NOR of the comparison signal and of the forward drive signal is logical "1," said reverse drive voltage when the NOR of the comparison signal and of the reverse drive signal is logical "1," and said zero drive voltage when the NOR of the comparison signal and the forward drive signal, and of the comparison signal and the reverse drive signal, are logical "0," the absolute value of said forward and reverse drive voltages growing successively smaller as the level of the analog signal grows successively larger than the minimum value of the sawtooth signal.

* * * * *

UNITED STATES PATENT AND TRADEMARK OFFICE
CERTIFICATE OF CORRECTION

PATENT NO. : 4,404,508

DATED : September 13, 1983

INVENTOR(S) : Koji Nishida and Taneichi Kawai

It is certified that error appears in the above—identified patent and that said Letters Patent is hereby corrected as shown below:

In Claim 1, line 24, delete "position" (second occurrence).

Signed and Sealed this

Twenty-ninth Day of November 1983

[SEAL]

Attest:

GERALD J. MOSSINGHOFF

Attesting Officer     Commissioner of Patents and Trademarks